United States Patent
Naka

(10) Patent No.: US 8,326,921 B2
(45) Date of Patent: Dec. 4, 2012

(54) DATA COMMUNICATION DEVICE, TERMINAL DEVICE, AND DATA COMMUNICATION SYSTEM USING THE SAME

(75) Inventor: Ken Naka, Tokyo (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 12/739,770

(22) PCT Filed: Nov. 12, 2008

(86) PCT No.: PCT/JP2008/003298
§ 371 (c)(1),
(2), (4) Date: Apr. 26, 2010

(87) PCT Pub. No.: WO2009/063635
PCT Pub. Date: May 22, 2009

(65) Prior Publication Data
US 2010/0250664 A1    Sep. 30, 2010

(30) Foreign Application Priority Data
Nov. 12, 2007  (JP) .................................. 2007-292840

(51) Int. Cl.
G06F 15/16  (2006.01)
(52) U.S. Cl. ....................................................... 709/203
(58) Field of Classification Search .................... 709/203
See application file for complete search history.

(56) References Cited

U.S. PATENT DOCUMENTS

| | | | |
|---|---|---|---|
| 6,831,897 B2 | 12/2004 | Takagi et al. | |
| 6,917,593 B2 | 7/2005 | Takagi et al. | |
| 7,260,065 B2 | 8/2007 | Takagi et al. | |
| 7,363,498 B2 * | 4/2008 | Hennessey et al. | 713/176 |
| 2004/0010588 A1 * | 1/2004 | Slater et al. | 709/224 |
| 2007/0063040 A1 | 3/2007 | Ohishi | |

FOREIGN PATENT DOCUMENTS

| | | |
|---|---|---|
| JP | 10-208005 | 8/1998 |
| JP | 2004-013765 | 1/2004 |
| JP | 2004-199226 | 7/2004 |
| JP | 2005-339507 | 12/2005 |
| JP | 2006-014110 | 1/2006 |
| JP | 2006-279669 | 10/2006 |
| JP | 2006-330903 | 12/2006 |
| JP | 2007-087032 | 4/2007 |
| JP | 2007-257483 | 10/2007 |

* cited by examiner

*Primary Examiner* — Andrew Georgandellis
(74) *Attorney, Agent, or Firm* — Greenblum & Bernstein, P.L.C.

(57) ABSTRACT

A data communication device with no wait time, which multiple users can operate simultaneously, each user being able to obtain desired content simultaneously, regardless of the content of a content screen, being the same or different content screens. A body of the data communication device is provided with a communication unit having a terminal and a plurality of communication elements for communicating content, a transferring unit for transferring content to certain communication elements of the communication unit, and an associated data creating unit for selecting the communication elements to which content is to be transferred from among the plurality of communication elements. Content can thereby be provided simultaneously to multiple users without a wait time, and areas from which content can be obtained can thereby be varied dynamically. Operations related to provision of content, such as to many users, are therefore easy.

15 Claims, 6 Drawing Sheets

| RANKING | CONTENTS | COMMUNICATION SECTION | | DISPLAY SECTION | | | | |
|---|---|---|---|---|---|---|---|---|
| | | COMMUNICATION ELEMENTS | | CONTENT AREA | COLOR | DISPLAY SHAPE | DISPLAY CONTENTS | DISPLAY INTERVAL (MIN) |
| 1 | aa | 13-1 13-3 13-7 | 13-2 13-6 13-8 | 121 J PIXELS OF TOP-LEFT PART | RED | OVAL | aa(AA) | 5 |
| 2 | bb | 13-4 13-9 | 13-5 13-10 | 122 K PIXELS OF TOP-RIGHT PART | BLUE | OVAL | bb(BB) | 5 |
| 3 | cc | 13-11 13-13 | 13-12 | 123 L PIXELS OF BOTTOM-LEFT PART | GREEN | OVAL | cc(CC) | 5 |
| 4 | dd | 13-14 | | 124 M PIXELS OF BOTTOM-CENTER PART | YELLOW | CIRCLE | dd(DD) | 5 |
| 5 | ee | 13-15 | | 125 N PIXELS OF BOTTOM-RIGHT PART | PINK | CIRCLE | ee(EE) | 5 |

FIG.2

DATA COMMUNICATION DEVICE, TERMINAL DEVICE, AND DATA COMMUNICATION SYSTEM USING THE SAME

TECHNICAL FIELD

The present invention relates to a kiosk terminal or suchlike data communication apparatus, terminal device, and data communication system using the same that enable content such as music information, image information, store/restaurant information, travel destination information, and the like to be acquired by a user terminal.

BACKGROUND ART

A conventional data communication apparatus of this kind is known that is equipped with a customer database storing acquired content-related information on a user-by-user basis as customer information, an ID acquisition section that acquires ID information identifying a user, and a display section that displays operating buttons on a user-by-user basis using customer information corresponding to ID information (see Patent Document 1). According to this technology, user-specific operating buttons can be displayed to a user without displaying unnecessary operating buttons, enabling a user to reach a desired content screen quickly.

Patent Document 1: Japanese Patent Application Laid-Open No. 2004-13765

DISCLOSURE OF INVENTION

Problems to be Solved by the Invention

However, with this kind of conventional data communication apparatus, it has not been envisaged that a plurality of persons would operate the data communication apparatus. Therefore, if there are a plurality of users desiring the same content screen, repetition of the same operating buttons is necessary for each user, and each user must face a long wait time.

Also, with the kind of conventional data communication apparatus described in above Patent Document 1, the operating time of each user is shortened, but ID information is necessary for each user. Therefore, a plurality of persons cannot operate a data communication apparatus simultaneously despite desiring the same content screen, making a wait time unavoidable.

It is an object of the present invention to resolve the above problems of a conventional data communication apparatus, and to provide a data communication apparatus, terminal device, and data communication system using the same that enable a plurality of users to operate simultaneously without a wait time regardless of the contents of a content screen, whether the same content screen or different content screens, and enable each user to acquire desired content simultaneously.

Means for Solving the Problem

A data communication apparatus of the present invention is equipped with a communication section and a plurality of communication elements for communicating content vis-à-vis a terminal device, a transfer section that transfers content to a predetermined communication element of the communication section, and a correspondence information creation section that decides a communication element to which content is transferred from among the plurality of communication elements.

By this means, the same content can be provided simultaneously to a plurality of users without a wait time, and an area from which content can be acquired can be changed dynamically, so that operations related to provision of content, such as the provision of content to more users, are easy.

A terminal device having: a communication section that has a plurality of communication elements for communicating content; a transfer section that transfers content to a predetermined communication element of the communication section; and a correspondence information creation section that decides a communication element to which content is transferred from among the plurality of communication elements, wherein the communication section includes a receiving section that receives the content and information identifying the content via a communication element to which the content is transferred from a data communication apparatus transmitting information identifying content before transmitting content, the terminal device comprising a reception determination section that determines whether or not reception of the content is performed based on information identifying the content received by the receiving section.

By this means, whether or not content reception is performed is determined in advance by performing communication of information identifying content with a communication section of a data communication apparatus, enabling reception of incorrect content to be prevented.

A data communication system of the present invention has a configuration equipped with a data communication apparatus having a communication section having a plurality of communication elements for communicating content, a transfer section that transfers content to a predetermined communication element of the communication section, and a correspondence information creation section that decides a communication element to which content is transferred from among the plurality of communication elements; and a terminal device that receives content via a communication element from the data communication apparatus.

By this means, error-free content reception can be performed after confirming the detail of content in advance between a terminal device and a data communication apparatus.

ADVANTAGEOUS EFFECTS OF INVENTION

A data communication apparatus of the present invention enables a communication element to which content is transferred to be decided from among a multiplicity of communication elements by a correspondence information creation section, enabling the same content to be provided simultaneously to a plurality of users without a wait time, and an area from which content can be acquired to be changed dynamically, so that operations related to provision of content, such as the provision of content to more users, are easy.

BRIEF DESCRIPTION OF DRAWINGS

FIG. 2 is a conceptual diagram showing an example of correspondence information of Embodiment 1;

BEST MODE FOR CARRYING OUT THE INVENTION

Now, embodiments of a data communication apparatus of the present invention will be described with reference to the accompanying drawings.
(Embodiment 1)

Figure 1:
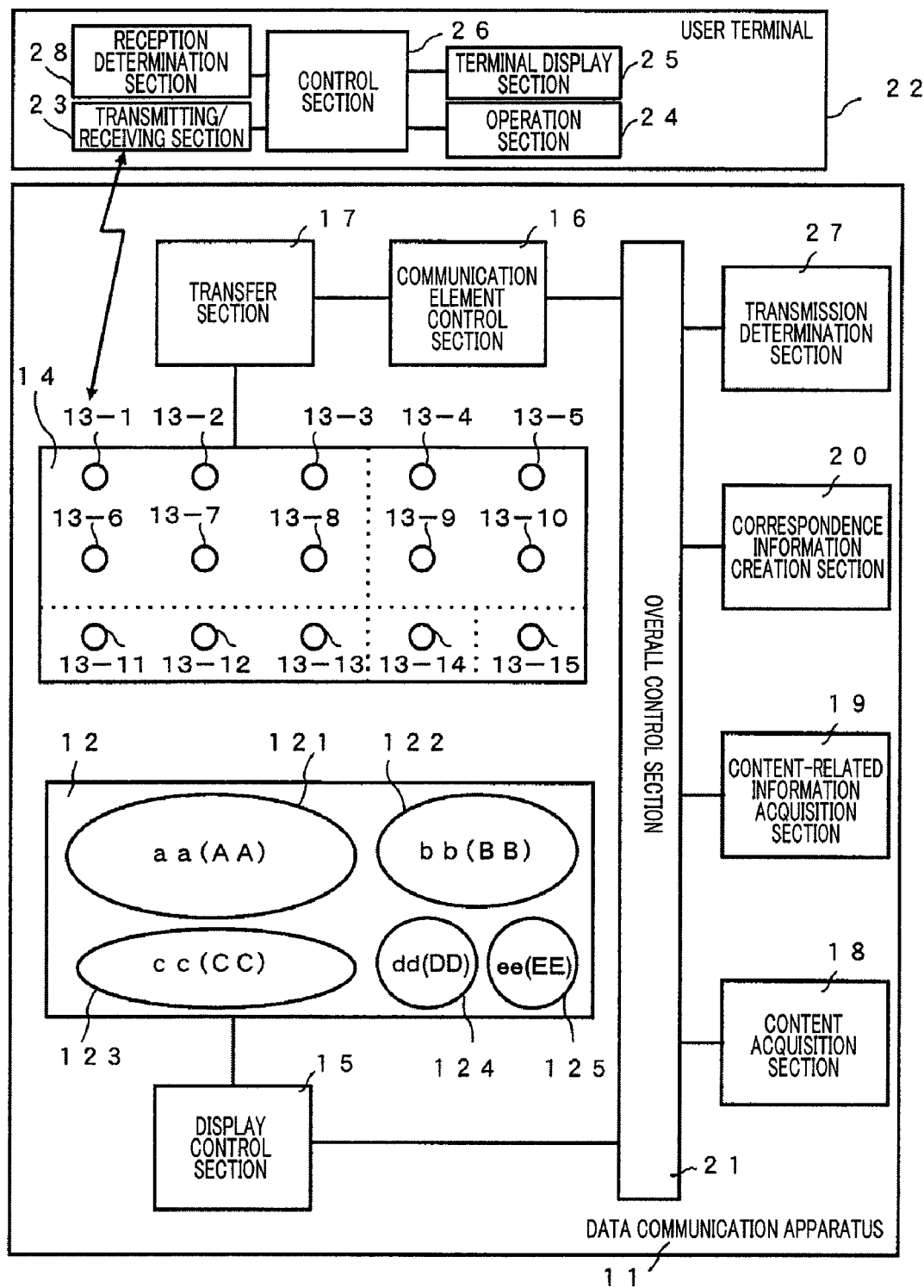
FIG. 1 is a block diagram showing a configuration according to Embodiment 1 of a data communication apparatus of the present invention.

FIG. 1 is a block diagram showing a configuration according to Embodiment 1 of a data communication apparatus of the present invention.

In this embodiment, a data communication apparatus capable of distributing music of various genres is described as an example, but the present invention is not limited to this. The present invention can be applied to various kinds of content distribution services, including moving images such as movies, still images such as photographs, tickets for concerts, movies, sports events, museums, and the like, train and plane tickets, and so forth.

First, an outline of this embodiment will be given using FIG. 1.

In FIG. 1, apparatus body 11 of a data communication apparatus of this embodiment is equipped with display section 12 and communication section 14 mounted on display section 12. Display section 12 displays content areas 121 through 125 corresponding respectively to a plurality of provided content. In communication section 14, communication elements 13-1 through 13-15 (hereinafter referred to as communication elements 13 when not specifying a particular one) are formed in a plurality of matrix shapes. Communication elements 13 are, for example, sheet antennas, and are capable of directional radio communication by means of millimeter wave UWB (ultrawideband). The communication method is not limited to millimeter wave UWB, and microwave or optical communication or the like may also be used.

Apparatus body 11 is also equipped with display control section 15, communication element control section 16, and transfer section 17. Display control section 15 controls the display contents of display section 12. Communication element control section 16 controls communication elements 13 of communication section 14. Transfer section 17 transfers user-requested content to communication element 13 supplying that content among communication elements 13.

Apparatus body 11 is also equipped with content acquisition section 18 and content-related information acquisition section 19. Content acquisition section 18 acquires and stores content. Content-related information acquisition section 19 acquires and stores content-related information, such as statistical information related to content, for example.

Apparatus body 11 is also equipped with correspondence information creation section 20. Correspondence information creation section 20 creates correspondence information showing a correspondence relationship between content, communication elements 13, and display section 12. Specifically, this correspondence information decides which content is transferred to which communication element 13, and also how a content area of display section 12 corresponding to that communication element 13 is displayed.

Apparatus body 11 is also equipped with transmission determination section 27 and overall control section 21. Transmission determination section 27 determines whether or not content transmission is performed based on information transmitted from user terminal 22, which is a terminal device used by a user. Overall control section 21 controls all of these configuration elements.

A user holds user terminal 22 over a desired area among content areas 121 through 125 on apparatus body 11 having this kind of configuration. By this means, desired content is distributed to user terminal 22 via communication element 13 positioned above that area.

A PDA, AV device, information terminal, mobile phone, or the like is used as user terminal 22. User terminal 22 comprises transmitting/receiving section 23, operation section 24, terminal display section 25, reception determination section 28, and control section 26. Transmitting/receiving section 23 performs communication with apparatus body 11. Operation section 24 accepts a user operation. Terminal display section 25 displays reception contents, operation contents, and so forth. Reception determination section 28 determines whether or not content reception is performed. Control section 26 performs overall control of user terminal 22.

Next, the above configuration elements will be described in detail.

Display section 12 comprises a liquid crystal display panel or the like, and displays content areas 121 through 125 having the large size in the order of popularity of the J-POP genre, for example. Assume that No. 1 in popularity is song "aa" by singer "AA", No. 2 is song "bb" by singer "BB", No. 3 is song "cc" by singer "CC", No. 4 is song "dd" by singer "DD", and No. 5 is song "ee" by singer "EE". In this case, content area 121 is displayed as a red oval having the largest size, and indicates that the content of that area is song "aa".

Then blue, oval content area 122 corresponding to song "bb", green, oval content area 123 corresponding to song "cc", yellow, circular content area 124 corresponding to song "dd", and pink, circular content area 125 corresponding to song "ee", are displayed in order with areas of gradually diminishing size.

Not just the area, but also at least a song and singer indicating the respective content, are displayed in each of content areas 121 through 125. That is to say, song "aa" and singer "AA" are displayed in content area 121 in the form "aa (AA)". Similarly, "bb (BB)" through "ee (EE)" are displayed in content areas 122 through 125. By this means a user can ascertain what kind of content can be obtained from which of content areas 121 through 125.

Communication section 14 is mounted on the surface of display section 12. Each communication element 13 of communication section 14 comprises a sheet antenna made of optically-transparent flexible material and an associated drive circuit enabling communication with user terminal 22 by means of millimeter wave UWB. The sheet antenna and drive circuit need not necessarily be separate entities as in this embodiment, but may also be an integral unit.

Each communication element 13 is independent, and is connected to transfer section 17 by thin-film wiring (not shown).

A loop of metallic material such as copper or ferrite in a sheet of optically-transparent organic material, for example, is generally used as a sheet antenna.

A polyimide film or photo solder mask film called a coverlay is generally used as an insulator, and copper is generally used as a conductor.

Therefore, content areas 121 through 125 of display section 12 can be seen through communication section 14 from the surface of communication section 14.

By this means, a user holding user terminal 22 over one of content areas 121 through 125 to be acquired can receive distribution of the desired content to user terminal 22 from communication element 13 under that user terminal.

Transfer section 17 comprises a driver that performs sheet antenna control, middleware such as a communication protocol, and application software that transfers content corresponding to an antenna.

Content-related information acquisition section 19 acquires and stores content-related information from outside via the Internet or the like. In this embodiment, content-related information acquisition section 19 acquires statistical information such as popularity ranking, popularity ranking by age, popularity ranking by genre, ranking by single CD sales, and so forth. If such statistical information is periodically updated, it is possible to determine from the statistical information at approximately what intervals updating is performed. Therefore, for example, content-related information acquisition section 19 determines a suitable update interval from the statistical information, and acquires, updates, and stores statistical information periodically.

Content-related information acquisition section 19 also has information on music purchased via apparatus body 11 input as history, and reflects those results in the rankings as necessary. For example, content-related information acquisition section 19 handles this as apparatus body 11 purchase ranking information, and updates sales rankings.

Content acquisition section 18 acquires and stores various kinds of content from outside via the Internet. For example, content acquisition section 18 acquires and stores songs ranked in rankings acquired by content-related information acquisition section 19.

Content attached information such as mp3 file ID3 tag information, for example, is attached to content. In this case, the title, artist's name, album name, and so forth can be acquired from the content attached information.

Instead of acquiring this content and content-related information via the Internet, provision may be made for the data communication apparatus to acquire these using various kinds of media storing them.

Correspondence information creation section 20 creates correspondence information indicating a correspondence relationship between content, communication elements 13, and content areas 121 through 125, based on content-related information acquired by content-related information acquisition section 19. As shown in FIG. 2, this correspondence information describes which communication elements 13 are used to provide a popular song to a user, or what kind of provision is made for display of that content area of display section 12.

For example, as shown in the first row (the ranking "1" row) in FIG. 2, correspondence information creation section 20 creates correspondence information with contents providing for song "aa" that is No. 1 in popularity to be provided from top-left six communication elements 13-1 through 13-3 and 13-6 through 13-8. Also, correspondence information creation section 20 creates correspondence information with contents indicating that red, oval content area 121 and characters "aa (AA)" in that area are displayed for five minutes on display section 12 using J pixels of the top-left part corresponding to communication elements 13-1 through 13-3 and 13-6 through 13-8.

Here, correspondence information creation section 20 knows the total number of pixels of display section 12. Therefore, by having the content supplying side decide in advance up to what ranking level is to be displayed, what difference in size is to be applied to adjacent rankings, and the like, taking user purchasing predictions and so forth into consideration, correspondence information creation section 20 can automatically calculate the areas of content areas 121 through 125.

Also, since correspondence information creation section 20 knows in advance the number and positions of communication elements 13 of communication section 14, it can automatically calculate and select communication elements 13 corresponding to content areas 121 through 125. Therefore, correspondence information creation section 20 can easily perform display settings for controlling display section 12 based on popularity rankings acquired by content-related information acquisition section 19 by deciding in advance the color, display contents, display time, and so forth of each ranking.

For example, it is predicted that many people will want to purchase a song that is No. 1 in popularity. Therefore, correspondence information creation section 20 makes content area 121 showing the song that is No. 1 in popularity the largest as in this embodiment, and also makes the number of communication elements 13-1 through 13-3 and 13-6 through 13-8 corresponding to content area 121 six, which is the largest number.

Correspondence information creation section 20 also creates correspondence information for other songs in the same way as for song "aa", as follows. As shown in the second row (the ranking "2" row) in FIG. 2, correspondence information for song "bb" that is No. 2 in popularity has contents indicating that the song is supplied using four communication elements 13-4, 13-5, 13-9, and 13-10 in the top-right part of communication section 14, and blue, oval content area 122 and characters "bb (BB)" in that area are displayed for five minutes using K pixels of the top-right part of display section 12.

Correspondence information for No. 3 song "cc" has contents indicating that the song is supplied using three communication elements 13-11 through 13-13 in the bottom-left part of communication section 14, and green, oval content area 123 and characters "cc (CC)" are displayed for five minutes using L pixels of the bottom-left part of display section 12.

Correspondence information for No. 4 song "dd" has contents indicating that the song is supplied using one communication element 13-14 in the bottom-center part of communication section 14, and yellow, circular content area 124 and characters "dd (DD)" are displayed for five minutes using M pixels of the bottom-center part of display section 12.

Correspondence information for No. 5 song "ee" has contents indicating that the song is supplied using one communication element 13-15 in the bottom-right part of communication section 14, and pink, circular content area 125 and characters "ee (EE)" are displayed for five minutes using N pixels of the bottom-right part of display section 12.

In this embodiment, content-related information acquisition section 19 acquires content-related information via the Internet. Therefore, if information acquired sequentially via the Internet differs from previously stored information, content-related information acquisition section 19 automatically performs calculation at that timing, and updates the stored content-related information. Therefore, correspondence information creation section 20 can constantly create the latest correspondence information by changing correspondence information of content-related information at timing at which content-related information stored by content-related information acquisition section 19 is updated.

However, the procedure is not limited to this, and correspondence information creation section 20 may also change correspondence information each time content-related information acquisition section 19 contents are confirmed at predetermined intervals. The correspondence information change timing can be set arbitrarily.

Display control section 15 controls display section 12 display driving based on correspondence information created by correspondence information creation section 20. For example, display control section 15 drives the liquid crystal display panel of display section 12 so as to display content areas 121 through 125 in accordance with "Content Area", "Color", "Display Shape", "Display Contents", and "Display Interval" established by the correspondence information shown in FIG. 2 in correspondence with the content of popularity rankings No. 1 through No. 5.

Display control section 15 displays the same state until content-related information acquisition section 19 acquires new content-related information and performs an update. Then, if display control section 15 determines that there is a variation in correspondence information between content generated by correspondence information creation section 20, display section 12, and communication elements 13, display control section 15 switches the display of display section 12 based on that new correspondence information. For example, if there is a change in the rankings, "Content" and "Display Contents" corresponding to communication elements change, and therefore the display section 12 display is switched.

Communication element control section 16 performs transfer settings relating to what content is provided from what communication elements 13, based on correspondence information created by correspondence information creation section 20.

For example, based on the correspondence information shown in FIG. 2, communication element control section 16 makes preparations by making a setting for transfer to six communication elements 13-1 through 13-3 and 13-6 through 13-8 and transfer section 17 so that song "aa" that has the No. 1 popularity ranking can be provided to these communication elements. In this way, transfer setting is performed so that more popular content is supplied from more communication elements 13 by handling the relevant content area in accordance with the correspondence information shown in FIG. 2.

Transfer section 17 accepts a connection request from user terminal 22 via communication elements 13 by a user's action of holding user terminal 22 over one of content areas 121 through 125. In this case, transmission determination section 27 determines whether or not content should be transmitted based on user or terminal authentication. Then overall control section 21 performs overall processing necessary for a purchase, such as payment and so forth. Following this, transfer section 17 fetches content corresponding to the respective communication elements 13 from content acquisition section 18 and transfers it to communication elements 13 in accordance with a setting made by communication element control section 16. By this means, user terminal 22 can acquire a song corresponding to a content area over which user terminal 22 is held from communication elements 13.

Transmission determination section 27 determines whether or not content transmission is performed based on information transmitted from user terminal 22 indicating whether the content to be transmitted from apparatus body 11 is the content desired by the user.

Transmitting/receiving section 23 of user terminal 22 can communicate with communication elements 13 of apparatus body 11 by means of millimeter wave UWB, and performs transmission/reception of data for authentication and content confirmation.

Operation section 24 comprises numeric keys, symbol keys, and so forth, and accepts user operations. Terminal display section 25 adds detail of contents transmitted/received by transmitting/receiving section 23, and the situation at the time of authentication.

Reception determination section 28 determines whether or not content reception is performed based on information identifying content transmitted from apparatus body 11 and received by transmitting/receiving section 23. Control section 26 performs overall control of user terminal 22.

Figure 3:
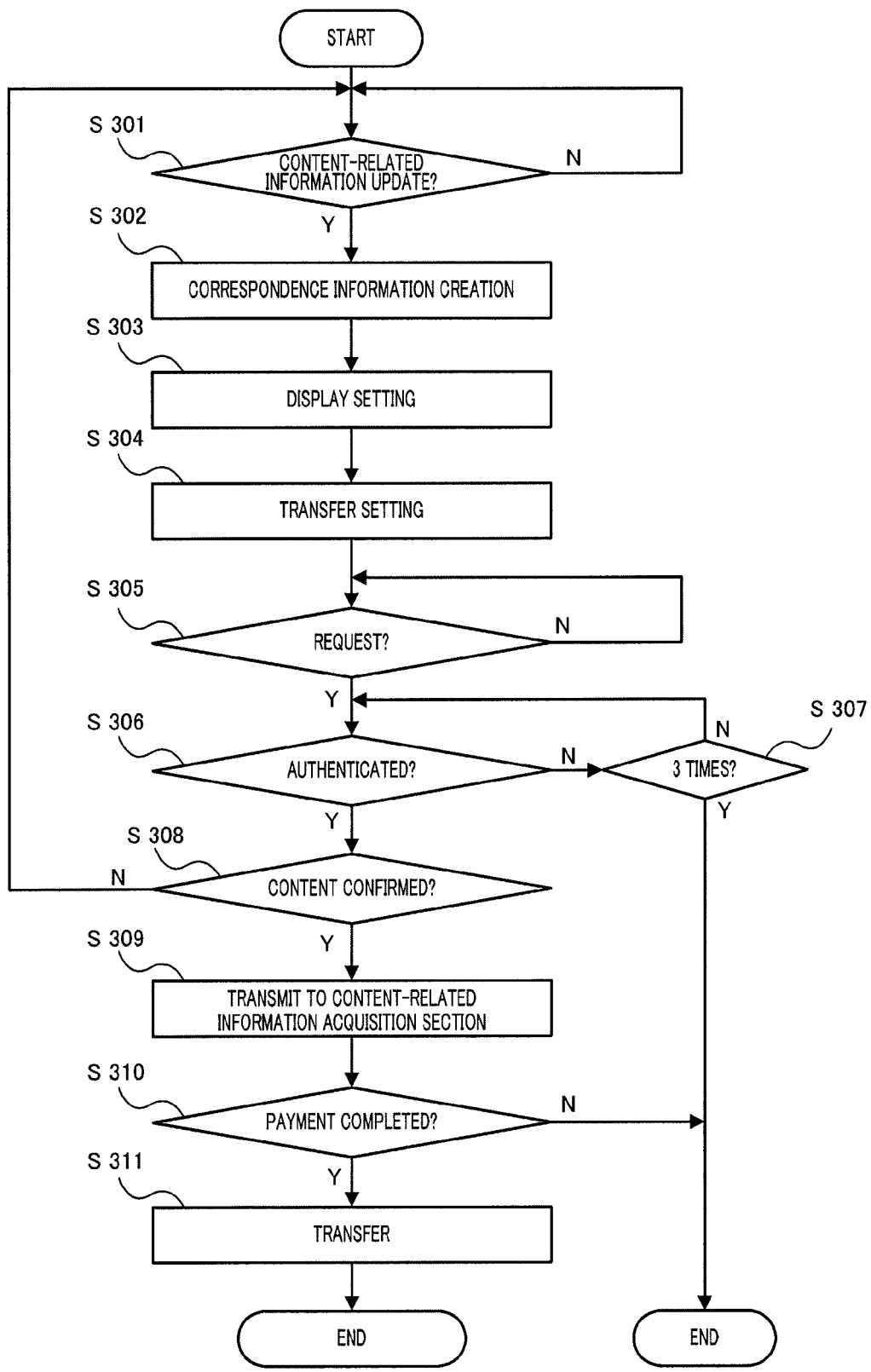
FIG. 3 is a flowchart showing the operation of Embodiment 1.

FIG. 3 is a flowchart showing the operation of this embodiment. This operation will be described using FIG. 3 while referring to FIG. 1 and FIG. 2.

First, content-related information acquisition section 19 periodically acquires content-related information via the Internet based on a directive from overall control section 21 of apparatus body 11. Then overall control section 21 determines whether or not there has been a content-related information update (S301).

If there has been no control information update (S301: N), content-related information acquisition section 19 periodically repeats the above determination until there is an update.

If there has been a content-related information update (S301: Y), correspondence information creation section 20 creates new correspondence information for content, display section 12, and communication elements 13 based on the content-related information for which there has been an update, according to a directive from overall control section 21 (S302).

For example, correspondence information creation section 20 acquires a combination of content name and ranking information as content-related information, and constantly creates the latest correspondence information by updating the "Content" and "Display Contents" fields of the correspondence information in FIG. 2. Also, content-related information acquisition section 19 tallies a combination of content name and number of purchases as history, and constantly obtains the latest correspondence information by changing the "Content" and "Display Contents" fields of the correspondence information in FIG. 2 in accordance with the number of purchases.

Correspondence information creation section 20 may also change the number of communication elements of each ranking, and the size of a displayed circle or oval, in proportion to the number of purchases.

Next, display control section 15 makes display settings based on new correspondence information created by correspondence information creation section 20, according to a directive from overall control section 21 (S303). Display settings relate to the display location and display contents of the content area of each content, such as which content is displayed in which way in which content area.

Then communication element control section 16 makes a transfer setting to enable relevant content to be transferred to communication elements 13 corresponding to each content area, such as content and construction of a distribution path of content and communication elements 13 supplying the content, based on new correspondence information created by correspondence information creation section 20, according to a directive from overall control section 21 (S304).

Steps S303 and S304 need not necessarily be performed in the order of this embodiment, but may be performed in parallel, or in the reverse order, for example.

In this state, apparatus body 11 waits for a content purchase request from a user. That is to say, overall control section 21 determines whether or not there is a content purchase request by a user (S305).

If there is no content purchase request from a user (S305: N), overall control section 21 repeats the above determination until there is a content request.

Following this, a user holds his or her user terminal 22 over and within one of content areas 121 through 125 showing desired content on display section 12, and requests content purchase from transmitting/receiving section 23 by operating operation section 24. In this case, overall control section 21 detects the content purchase request from the user by means of noncontact communication via communication element 13 (S305: Y).

Operating operation section 24 here means initiating a purchasing application installed in user terminal 22, selecting a content purchase item from a menu on user terminal 22, or the like.

If there is a content purchase request from user terminal 22 (S305: Y), transmission determination section 27 of apparatus body 11 acquires a user ID from control section 26 of user terminal via communication element 13 and transmitting/receiving section 23, and performs normal authentication processing (S306).

Normal authentication processing here includes user-related authentication processing such as checking whether or not a user requesting content has concluded a purchase contract, possesses a card valid for card payment, is a member who can purchase the relevant content, and so forth. Also included is user terminal 22 related authentication processing such as checking whether the used user terminal 22 is a type of terminal supported by apparatus body 11.

The user is notified of the progress of the authentication processing by a display on terminal display section 25 of user terminal 22. The user is subject to authentication by operating operation section 24 as necessary while viewing this progress report.

If authentication cannot be performed in step S306 (S306: N), transmission determination section 27 determines whether or not the number of times authentication has been attempted is three (S307), and if this is not the third time (S307: N), performs authentication again (S306). If authentication is determined to have been attempted three times in step S307 (S307: Y), transmission determination section 27 notifies this result to the user by means of a display on terminal display section 25 of user terminal 22, and terminates the content purchase operation. The number of authentication attempts is not limited to three.

If authentication is successful in step S306 (S306: Y), transmission determination section 27 determines which content the user is requesting from which communication element 13 has established communication with user terminal 22, based on correspondence information created by correspondence information creation section 20. Then transmission determination section 27 transmits content attached information such as the content name to user terminal 22 via communication element 13. User terminal 22 receives content attached information such as the content name transmitted from apparatus body 11 via transmitting/receiving section 23, displays this on terminal display section 25 according to a directive from reception determination section 28, and performs processing to confirm the detail of the content to be supplied to the user (S308).

If the content name displayed on terminal display section 25 of user terminal 22 is not that requested by the user, the user performs an operation such as inputting "NO" via operation section 24, for example. In this case, in step S308 reception determination section 28 transmits a signal indicating that the content name is not correct to communication element 13 of apparatus body 11 via transmitting/receiving section 23.

When a signal indicating that the content name is not correct is received by communication element 13, transmission determination section 27 of apparatus body 11 determines that the content about to be supplied is not the song the user wishes to purchase (S308: N), returns to step S301, and repeats the operations up to that point.

On the other hand, if the content name displayed on terminal display section 25 of user terminal 22 is that requested by the user, the user performs an operation such as inputting "YES" via operation section 24, for example. In this case, in step S308 reception determination section 28 transmits a signal indicating that the content name is correct to communication element 13 of apparatus body 11 via transmitting/receiving section 23.

When a signal indicating that the content name is correct is received by communication element 13, transmission determination section 27 of apparatus body 11 determines that the content about to be supplied is the song the user wishes to purchase (S308: Y), and transmits content-related information indicating that the relevant content has been purchased from apparatus body 11 to content-related information acquisition section 19 (S309).

Following this, transfer section 17 performs normal payment processing vis-à-vis user terminal 22 via communication element 13 based on a directive from overall control section 21 (S310). The user can confirm the progress of identification processing on terminal display section 25 of user terminal 22, and perform necessary operations via operation section 24.

If payment processing is not completed in step S310 (S310: N), overall control section 21 of apparatus body 11 transmits "payment not completed" information from communication element 13 to transmitting/receiving section 23 of user terminal 22. In response to this, control section 26 of user terminal 22 displays "payment not completed" information on terminal display section 25, and terminates the content purchase operation.

If payment processing is completed in step S310 (S310: Y), overall control section 21 of apparatus body 11 transmits "payment completed" information to transmitting/receiving section 23 of user terminal 22 via communication element 13. In response to this, control section 26 of user terminal 22 displays "payment completed" information on terminal display section 25.

At the same time as this, in accordance with a directive from overall control section 21 of apparatus body 11, transfer section 17 reads content for which there was a request from user terminal 22 from content acquisition section 18, and transfers this content to communication element 13 for which there is a communication connection with user terminal 22 (S311).

By this means, the user can receive distribution of requested content in user terminal 22 via communication element 13 and transmitting/receiving section 23.

As described above, with this embodiment a user can obtain desired content by holding user terminal 22 over a content area for which the user wishes to make a purchase from among content areas 121 through 125 displayed by display section 12, and performing an operation requesting a purchase. That is to say, by means of the above operations, communication is established with communication element 13 corresponding to that content area from among a plurality of communication elements 13 of communication section 14 mounted on the surface of display section 12, and purchased content is distributed to user terminal 22 from content acquisition section 18 via communication element 13.

Correspondence information creation section 20 decides the respective sizes of content areas 121 through 125 based on content-related information acquired by content-related information acquisition section 19. As a result, for example, large content area 121 is displayed for a highly popular song. That is to say, many communication elements 13 correspond to an area for highly popular content, so that even if many users requesting the same content simultaneously hold their respective user terminals 22 over the same content area 121, those users can receive distribution of the same content simultaneously. Therefore, even a highly popular song can be obtained immediately without a plurality of users having to wait in line.

As a result of users' purchases of content, the ranking of that content fluctuates, and, for example, popularity rankings themselves also fluctuate. In this embodiment, content-related information acquisition section 19 performs a ranking update each time a user purchases content, and correspondence information creation section 20 updates correspondence information based on this update. By this means, content areas and communication section 14, also, can perform display while carrying out dynamic changes in real time in synchronization with ranking fluctuations.

Therefore, a user can ascertain the latest information in real time via display section 12, and can select and purchase content based on that latest information.

In this embodiment, a data communication apparatus simply changes the sizes of content areas 121 through 125 in popularity ranking order, but provision may also be made for these areas and other display modes to be changed in accordance with other information. For example, if points indicating how many out of 100 people voted are acquired as content-related information for ranking, content areas corresponding to numbers of points can be displayed.

For example, assume that popularity ranking No. 1 is 45 points, No. 2 is 40 points, No. 3 is 10 points, No. 4 is 5 points, and No. 5 is 3 points. No. 1 content area 121 is made slightly larger in size than No. 2 content area 122, and No. 3 content area 123 is made sufficiently small in size for the difference in size compared with No. 2 content area 122 to be conspicuous. Also, No. 4 content area 124 is made slightly smaller in size than No. 3 content area 123, and sufficiently large in size for the difference in size compared with No. 5 content area 125 to be conspicuous. By reflecting points differences in the sizes of content areas 121 through 125 in this way, the degree of popularity of each content can be displayed on display section 12, and made available for reference by users when making a purchase.

Provision may also be made for a data communication apparatus, while displaying content areas 121 through 125 by popularity ranking, to display supplementary information in addition to the singer's name and song title—such as the J-POP ranking order—in the display contents of content areas 121 through 125. Supplementary information of this kind is also useful reference information for a user when making a purchase.

A data communication apparatus may also display a portrait or photograph of a singer and a picture or image illustrating a song in each of content areas 121 through 125. This makes it easier for a user to select content.

In this embodiment, correspondence information creation section 20 creates correspondence information for displaying popularity rankings No. 1 through No. 5, but display time interval correspondence information may also be created with the provision of differences in "Display Interval" in the correspondence information in FIG. 2. For example, correspondence information may indicate that No. 1 through No. 5 are displayed for the first five minutes, and No. 6 through No. 10 are displayed for the next five minutes. This enables a greater variety of content to be provided.

If a sports video is being displayed on display section 12, a user can obtain information on a featured player by holding user terminal 22 over video of that player during the game. In this case, correspondence information creation section 20 enters a communication element corresponding to the display location of a player and a content name indicating player-related information in the correspondence information matching time periods the video is reproduced.

Provision of detailed content can be performed by using a large-screen display section 12, and equipping communication section 14 with several hundred communication elements 13, for example.

For example, in a data communication apparatus, provision may be made for content areas 121 through 125 of display section 12 to be assigned to different genres in descending order of popularity, and for area display to be performed based on the popularity ranking of each genre among content areas 121 through 125.

In this case, correspondence information creation section 20 creates correspondence information indicating a correspondence relationship with genre in addition to the correspondence information shown in FIG. 2. Thus, content area 121 is assigned to the highly popular J-POP genre, and songs with J-POP popularity rankings No. 1 through No. 5 as described above, for instance, are displayed in that area. Content area 122 is assigned to the non-Japanese music genre ranked No. 2 in popularity, and displays songs with popularity rankings No. 1 through No. 5 in that genre. In this way, a data communication apparatus can be provided that caters to many users with different tastes.

In this embodiment, an example has been described in which only songs with popularity rankings No. 1 through No. 5 are distributed by all of content areas 121 through 125, but the distribution method is not limited to this. A data communication apparatus can also use content areas 121 through 124 for distribution of songs with popularity rankings No. 1 through No. 4, and use content area 125 for distribution of songs with popularity rankings No. 5 and below.

That is to say, for songs "ee" through "jj" with popularity rankings No. 5 through No. 10, a data communication apparatus performs distribution from communication element 13-15, displays content area 125 as a pink circle using N pixels at the bottom-right, and displays the letter "S" meaning "Select" in that area.

In this case, correspondence information creation section 20 need only add a number of content selection steps to the correspondence information shown in FIG. 2, set numbers of selection steps of different values for songs "ee" through "jj", and use the same contents for the other items. Then display control section 15 can change the contents displayed according to the number of selection steps.

Thus, if a user's desired song is not in content areas 121 through 124, the user holds user terminal 22 over content area 125 indicating content selection and establishes communication with communication element 13-15 corresponding to that area, and switches the display contents of content area 125. Assume, for example, that the user's desired song is "gg", and the number of selection steps for song "gg" is "3". In this case, by requesting a selection three times for communication element 13-15 in content area 125 to make a content request, the user can display content area 125 displaying target song "gg", and can receive distribution of song "gg" to user terminal 22 from communication element 13-15.

By this means, less popular content can be provided to a user desiring that content, and content can be distributed to more users.

In this embodiment, the size of a content area is changed by associating a plurality of adjacent communication elements 13 with particular content in accordance with correspondence information, but the method of association is not limited to this. A data communication apparatus may associate the same content with a plurality of non-adjacent communication elements 13 instead of adjacent communication elements 13. For example, when display section 12 is installed in a planar fashion, for instance, a plurality of communication elements 13 placed at intervals of a predetermined number around display section 12 may be associated with content. This makes it easier for users positioned around display section 12 to choose content.

In this embodiment, a method has been described whereby content is transmitted from apparatus body 11 of a data communication apparatus to user terminal 22, but conversely, content may also be transmitted from user terminal 22 to apparatus body 11 of a data communication apparatus. For example, a case can be imagined in which a user submits an image or video in entering a photographic or suchlike competition. In a case such as this, for example, display contents serving as content comprise an explanation of entry in a competition, and the greater the number of people who can enter a competition, the larger is the area assigned. Then a user makes a selection from among a number of displayed competitions, and can enter an image or video shot by the user from a user terminal in the selected competition.

By using this kind of configuration, a data communication apparatus can dynamically change an entry explanation area according to the number of competitions, communicate with a user terminal according to that explanation area, and accept a user entry operation.

Provision may also be made for correspondence information creation section 20 to create and store beforehand my-content areas similar to content areas 121 through 125 shown in FIG. 1 as correspondence information, receive user operations, and perform display based on the stored correspondence information. By this means, a user can later extract content that he or she has stored in content acquisition section 18.

Provision may also be made for content to be stored in apparatus body 11 using a different user terminal, and for that stored content to be extracted from data communication apparatus 11 by means of user terminal 22 operation.

Provision may also be made for a user other than the user who stored content in data communication apparatus 11 to extract that content.

(Embodiment 2)

This embodiment is an example in which a communication section described in Embodiment 1 is mounted on the surface of a travel agency's poster that switches between display of a map of Japan and display of a map of the world. In this embodiment, a user can obtain guidebook information on places in Japan or countries of the world as content by holding a user terminal over a place in Japan or a country the user wishes to visit on these maps.

The main difference from Embodiment 1 is that the detail of content displayed by a display comprise a poster display.

Figure 4:
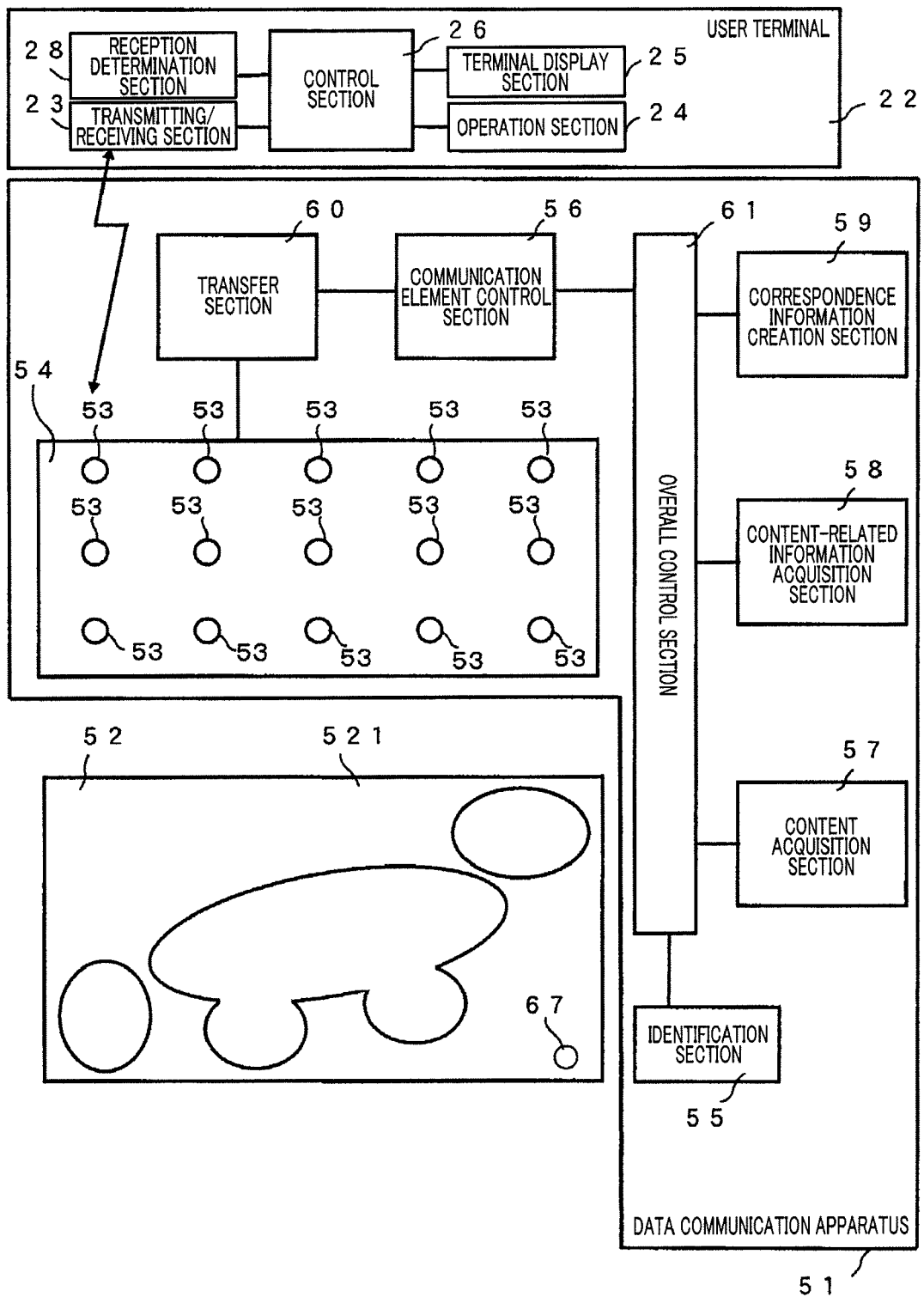
FIG. 4 is a block diagram showing a configuration according to Embodiment 2 of a data communication apparatus of the present invention.

FIG. 4 is a block diagram showing a configuration according to Embodiment 2 of a data communication apparatus of the present invention.

In FIG. 4, apparatus body 51 serving as a data communication apparatus of this embodiment is configured as a separate entity from display section 52 configured so that switching is performed between a map of Japan and a map of the world.

FIG. 4 shows display surface 521 that displays a map of Japan. Apparatus body 51 is equipped with communication section 54, identification section 55, and communication element control section 56. Communication section 54 is mounted on the surface of display section 52. Communication elements 53 comprising sheet antennas are formed in a matrix shape on communication section 54. Identification section 55 detects whether the display surface of display section 52 is displaying a map of Japan or a map of the world. Communication element control section 56 controls communication elements 53 of communication section 54 according to the display surface contents of display section 52 detected by identification section 55.

In this embodiment, as described later herein, identification section 55 is mounted inside communication section 54 in the same kind of configuration as communication elements 53 of communication section 54.

Apparatus body 51 is also equipped with content acquisition section 57 and content-related information acquisition section 58. Content acquisition section 57 acquires content comprising guidebook information on sightseeing spots, historic sites, local culinary specialties, and so forth, from outside, for example, and stores that content. Content-related information acquisition section 58 acquires and stores content-related information comprising Japan location or world country map position information (for example, coordinate information) on display section 52.

Apparatus body 51 is also equipped with correspondence information creation section 59, transfer section 60, and overall control section 61. Correspondence information creation section 59 creates correspondence information based on content acquired by content acquisition section 57 and display surface contents detected by identification section 55. This correspondence information indicates a correspondence relationship between display section 52 and communication elements 53. Transfer section 60 transfers content acquired by content acquisition section 57 to communication elements 53. Overall control section 61 controls all of these configuration elements.

User terminal 22 has the same configuration as in Embodiment 1 and is therefore assigned the same reference codes, and a description thereof is omitted here.

Figure 5:
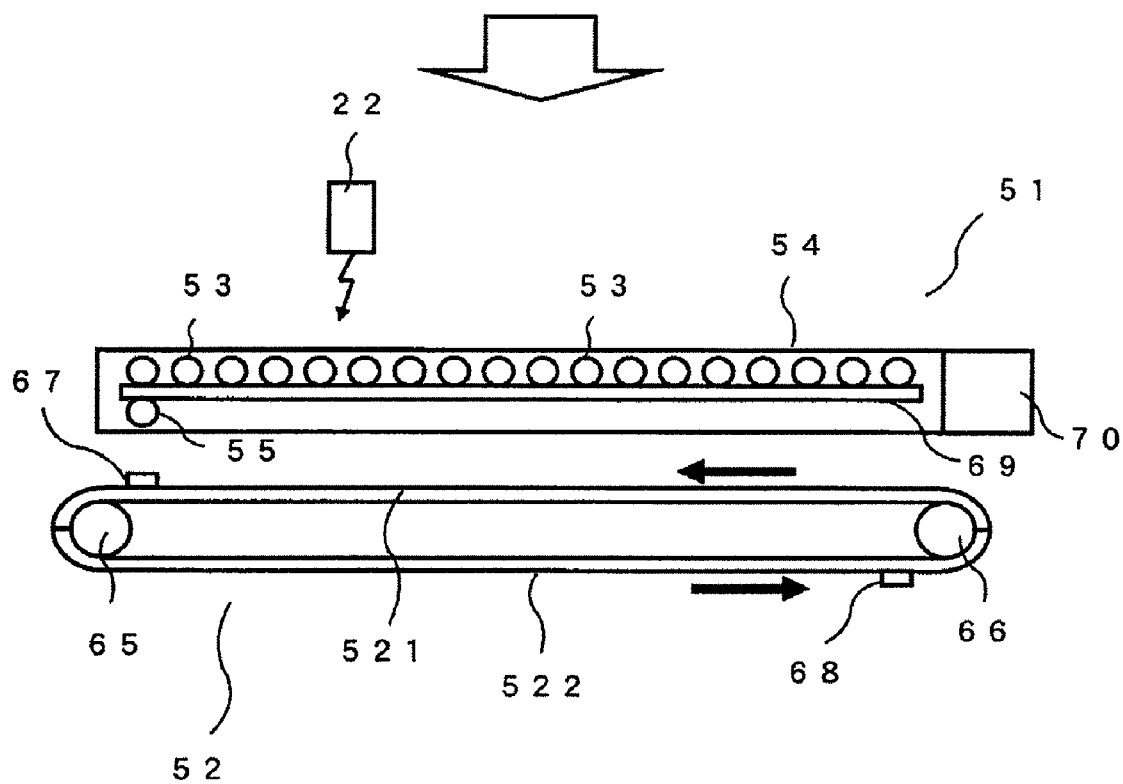
FIG. 5 is a plan view of the configuration of Embodiment 2.

FIG. 5 is a plan view of the configuration of a data communication apparatus of this embodiment.

In FIG. 5, display section 52 comprises display surface 521 that displays a map of Japan, display surface 522 that displays a map of the world, and two rotating rollers 65 and 66. Display surfaces 521 and 522 are joined together in the form of a continuous belt, and pass around rotating rollers 65 and 66 positioned parallel to and at a distance from each other. Through the rotation of these rotating rollers 65 and 66, display surfaces 521 and 522 are presented alternately to the user side (the upper side in the drawing) indicated by a broad white arrow. That is to say, display section 52 is configured in such a way that display surface 521 that displays a map of Japan and display surface 522 that displays a map of the world are presented alternately. At the bottom-right of display surface 521 and the bottom-right of display surface 522 (see FIG. 4) there are formed respectively data carriers 67 and 68 holding information indicating whether that map is a map of Japan or a map of the world.

Rotating rollers 65 and 66 are driven by a drive section (not shown) in a predetermined cycle in the direction indicated by solid arrows, and periodically present display surface 521 and display surface 522 alternately to the user side.

Apparatus body 51 of the data communication apparatus is arranged in such a way that communication section 54 overlaps the user side of display section 52. In communication section 54, a plurality of communication elements 53 are formed on the front (the upper side in the drawing) of substrate 69, and identification section 55 comprising a sheet antenna, for example, is formed on the rear (the lower side in the drawing) of substrate 69. Identification section 55 is positioned so as to be able to face data carrier 67 or 68 of display section 52.

Data carriers 67 and 68 are RFID (Radio Frequency Identification) or suchlike tags that hold information such as a tag ID (identifier) and additional information, and transmit the held information by means of radio communication. Identification section 55 may be an RFID reader. Data carriers 67 and 68 may use an electronic tag, IC tag, or the like as an RFID, for example, while other possibilities are an IC card or barcode.

In apparatus body 51, configuration elements other than communication section 54 (including communication elements 53) are mounted on drive section 70 on the periphery of communication section 54.

In this embodiment, content acquisition section 57 acquires content in advance from outside via the Internet or the like according to display section 52 display surface contents. In this embodiment, this acquired content is guidebook information on sightseeing spots, historic sites, culinary specialties, and so forth, for places in Japan or countries of the world.

Content-related information acquisition section 58 acquires display section 52 map information via the Internet or the like in advance, and stores position information Japan location or world country map position information on display section 52.

The data communication apparatus may acquire this content and content-related information using various kinds of storage media storing these, instead of via the Internet, and may also acquire these in advance by means of manual input by a user. It is also possible for the data communication apparatus to read display patterns of display surfaces 521 and 522, and automatically calculate positions of places in Japan and positions of countries of the world, for instance. That is to say, the information acquisition mode is in no way limited to the contents of this embodiment.

Correspondence information creation section 59 creates and stores correspondence information based on content acquired by content acquisition section 57 and map location information for display surfaces 521 and 522 acquired by content-related information acquisition section 58. This correspondence information indicates a correspondence relationship between map location information, content, and communication elements 53.

In the same way as in Embodiment 1, in communication section 54, communication elements 53 comprising sheet antennas are formed in a matrix shape on transparent substrate 69. Communication section 54 is mounted on the user-side surface of display section 52.

When data communication apparatus 51 configured in this way is viewed from the user side, display surface 521 or 522 of display section 52—that is, a map of Japan or a map of the world—is visible through communication section 54.

A user holds user terminal 22 over a desired place on the map of Japan or a desired country on the map of the world, and operates operation section 24. Sightseeing information for the place over which user terminal 22 is held is then transmitted to transmitting/receiving section 23 via communication element 53 corresponding to that place, and is displayed on terminal display section 25. That is to say, information desired by the user is distributed to user terminal 22.

Figure 6:
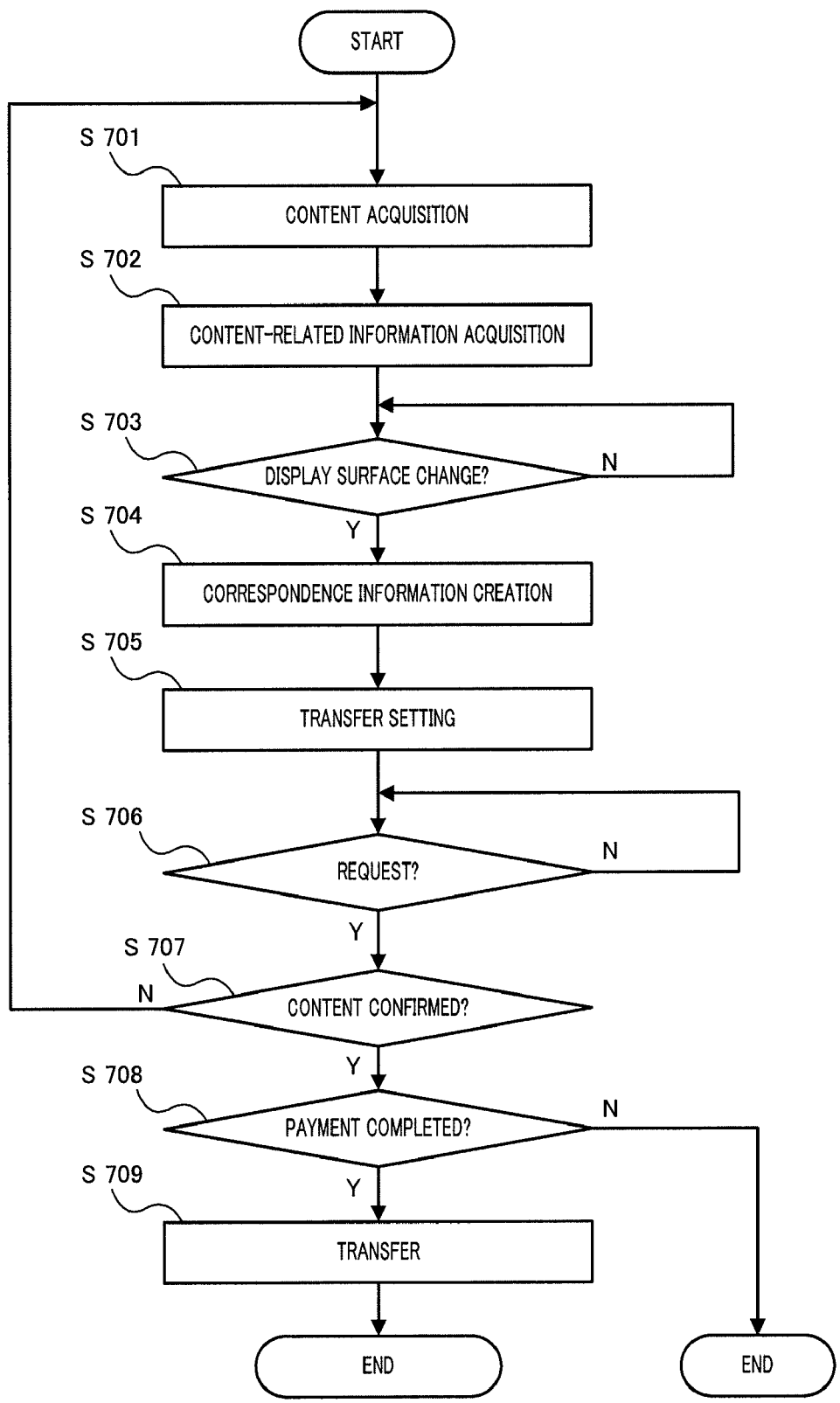
FIG. 6 is a flowchart showing the operation of Embodiment 2.

FIG. 6 is a flowchart showing the operation of a data communication apparatus of this embodiment. This operation will be described using FIG. 6 while referring to FIG. 4 and FIG. 5.

First, content acquisition section 57 periodically acquires guidebook information via the Internet based on a directive from overall control section 61 of apparatus body 51 (S701). By this means, constantly updated guidebook information is stored in content acquisition section 57.

Content-related information acquisition section 58 also periodically acquires content-related information via the Internet (S702). By this means, constantly updated map location information for display surfaces 521 and 522 is stored in content-related information acquisition section 58.

As described above, this content-related information is updated by various methods, such as rewriting the stored contents of a storage medium, performing updating based on a map pattern in display section 52, or the like.

Steps S701 and S702 may be performed in reverse order, or may be performed simultaneously in parallel.

Next, identification section 55 determines whether or not there has been a change in the display surface displayed by display section 52, based on a directive from overall control section 61 (S703).

If there is no change in the display surface (S703: N), identification section 55 waits until there is a display surface change.

If there is a change in the display surface (S703: Y), correspondence information creation section 59 creates correspondence information based on an identification section 55 detection result in accordance with a directive from overall control section 61 (S704). This correspondence information indicates a correspondence relationship between content, display surfaces 521 and 522 of display section 52, and communication elements 53.

That is to say, when rotating rollers 65 and 66 are rotated at predetermined intervals by a drive section (not shown), and display surfaces 521 and 522 of display section 52 are changed, the positions of data carriers 67 and 68 formed at the bottom-right of display surfaces 521 and 522 are periodically switched around. Identification section 55 of communication section 54 is formed at a position opposite data carriers 67 and 68. Therefore, each time display surfaces 521 and 522 are switched around, identification section 55 detects a change between display surface 521 and display surface 522. Correspondence information creation section 59 creates the kind of correspondence information described below according to a directive from overall control section 61 based on that detection result.

First, a case in which identification section 55 detects data carrier 67 of display surface 521 that displays a map of Japan will be described. Correspondence information creation section 59 creates correspondence information mutually associating location information indicating areas of places in Japan on display surface 521 acquired by content-related information acquisition section 58, communication element 53 of communication section 54 corresponding to that location information, and guidebook information of relevant places in Japan acquired by content acquisition section 57.

For example, correspondence information creation section 59 creates correspondence information mutually associating a location (for example, map coordinates) indicating an area on display surface 521 corresponding to Saitama Prefecture, a number of communication elements 53 covering a location corresponding to Saitama Prefecture, and Saitama Prefecture guidebook information. Correspondence information creation section 59 also creates correspondence information for other places in Japan in a similar way.

Next, a case in which identification section 55 detects data carrier 68 of display surface 522 that displays a map of the world will be described. In a similar way to the case of the map of Japan, correspondence information creation section 59 creates correspondence information mutually associating locations of world countries on display surface 522, a number of communication elements 53 covering locations corresponding to those countries, and guidebook information for those countries.

In this embodiment, only display surfaces 521 and 522 are switched around in display section 52. Therefore, it is not necessary for correspondence information creation section 59 to create correspondence information each time there is a switch-around operation if there is no change in the guidebook information. That is to say, correspondence information creation section 59 may store correspondence information for display surface 521 and correspondence information for display surface 522 once it has been created, and switch the selection of stored correspondence information according to an identification section 55 detection result.

Next, communication element control section 56 makes a transfer setting so that relevant guidebook information can be transferred to a communication element 53 corresponding to a place in Japan or a country of the world based on correspondence information created by correspondence information creation section 59 according to a directive from overall control section 61 (S705).

In this state, apparatus body 51 waits for a guidebook information acquisition request from a user through repeated determination by overall control section 61 as to whether or not there is a guidebook information acquisition request from user terminal 22 (S706).

If there is no guidebook information acquisition request from a user (S706: N), apparatus body 51 repeats the above determination until there is a guidebook information acquisition request.

Assume that, following this, a user makes a guidebook information acquisition request via transmitting/receiving section 23 by holding his or her user terminal 22 over a point somewhere within a place in Japan or a country of the world the user wishes to visit on display section 52, and operating operation section 24. In this case, overall control section 61 detects a guidebook information acquisition request from the user by means of noncontact communication via communication element 53 (S706: Y).

Next, overall control section 61 determines the place in Japan or the country of the world for which the user has requested guidebook information based on correspondence information of communication element 53 for which communication has been established with user terminal 22. This correspondence information has been created by correspondence information creation section 59 as described above. Then overall control section 61 transmits the name of the place in Japan or the country of the world for which a request has been made to user terminal 22 via communication element 53 for which communication has been established with user terminal 22. User terminal 22 receives the name of a place in Japan or the name of a country transmitted from communication element 53, and displays the transmitted Japanese place name or country name on terminal display section 25 based on a directive from control section 26. Then user terminal 22 performs confirmation processing vis-à-vis the user as to whether or not the displayed Japanese place name or country name has been requested (S707).

If the Japanese place name or country name displayed on terminal display section 25 of user terminal 22 is not that requested by the user, the user performs an operation such as inputting "NO" via operation section 24, for example. In response to this, reception determination section 28 transmits a signal indicating that that Japanese place name or country name is not correct to communication element 53 of apparatus body 51 via transmitting/receiving section 23. This transmission is performed based on a directive from control section 26.

When communication element 53 receives a signal indicating that the Japanese place name or country name is not correct, overall control section 61 of apparatus body 51 determines that the guidebook information about to be supplied is not that the user wishes to purchase (S707: N), returns to step S701, and repeats the operations up to that point.

On the other hand, if the Japanese place name or country name displayed on terminal display section 25 of user terminal 22 is that requested by the user, the user performs an operation such as inputting "YES" via operation section 24, for example. In response to this, reception determination section 28 transmits a signal indicating that the Japanese place name or country name is correct to communication element 53 of apparatus body 51 via transmitting/receiving section 23. This transmission is performed based on a directive from control section 26.

When a signal indicating that the Japanese place name or country name is correct is received by communication element 53, overall control section 61 of apparatus body 51 determines that the guidebook information about to be supplied is that the user wishes to purchase (S707: Y), and performs normal payment processing (S708). This payment processing is performed vis-à-vis user terminal 22 via communication element 53 based on a directive from overall control section 61. The user can confirm the progress of the payment processing on terminal display section 25 of user terminal 22, and perform necessary operations via operation section 24.

If payment processing is not completed (S708: N), overall control section 61 of apparatus body 51 transmits "payment not completed" information from communication element 53 to transmitting/receiving section 23 of user terminal 22. In response to this, control section 26 of user terminal 22 displays "payment not completed" information on terminal display section 25, and terminates the content purchase operation.

If payment processing is completed (S708: Y), overall control section 61 transmits "payment completed" information to transmitting/receiving section 23 of user terminal 22 via communication element 53. In response to this, control section 26 of user terminal 22 displays "payment completed" information on terminal display section 25. At the same time as this, in accordance with a directive from overall control section 61 of apparatus body 51, communication element control section 56 reads guidebook information for which there was a request from user terminal 22 from content acquisition section 57. Then communication element control section 56 transfers the read guidebook information to communication element 53 for which communication has been established with user terminal 22 (S709).

By this means, the user can receive distribution of requested guidebook information in user terminal 22 via communication element 53 and transmitting/receiving section 23.

As described above, with this embodiment a user can obtain desired guidebook information by holding user terminal 22 over a place in Japan or a country of the world on display section 52 for which the user wishes to obtain guidebook information, and performing an operation requesting a purchase. That is to say, by means of the above operations, communication is established with communication element 53 corresponding to that place in Japan or country from among a plurality of communication elements 53 of communication section 54 mounted on the surface of display section 52, and the necessary guidebook information is distributed to user terminal 22 from content acquisition section 57 via communication element 53.

Therefore, even if a plurality of users wish to obtain guidebook information for the same place in Japan or country of the world, the fact that a plurality of communication elements are provided corresponding to each location means that those users can obtain the same guidebook information simultaneously without having to wait in line.

Also, display surfaces 521 and 522 of display section 52 are switched around in a predetermined cycle decided by the travel agency, and data carriers 67 and 68 on display surfaces 521 and 522 that appear in line with those switch-around operations are detected by identification section 55. By this means, the data communication apparatus detects which of display surfaces 521 and 522 is being presented to a user, and based on that detection result, can dynamically switch communication element 53 to which guidebook information of a place in Japan or country of the world is transferred using correspondence information created by correspondence information creation section 59.

In this embodiment, communication section 54 is configured with communication elements 53 formed in a matrix shape on substrate 69 made of an organic or suchlike optically-transparent flexible material. Thus, communication section 54 can be laid over a poster wrapped around a pillar inside a railway station or the like, or affixed to a poster on a large wall of a building or the like. That is to say, communication section 54 of this embodiment can be applied to display sections 52 of various forms.

In the above embodiments, communication section 14/54 is mounted on the surface of display section 12/52, but the present invention is not limited to this, and display section 12/52 may conversely be mounted on communication section 14/54.

As described above, the present invention enables a predetermined number of communication elements to which content is transferred to be established from among many communication elements by a correspondence information creation section. By this means, the same content can be provided to a plurality of users simultaneously. Therefore, an area from which content can be acquired can be changed dynamically without a wait time, and content selection operations are easy.

A data communication apparatus of the present invention is equipped with a communication section having a plurality of communication elements for communicating content vis-à-vis a terminal device, a transfer section that transfers content to a predetermined communication element of the communication section, and a correspondence information creation section that decides a communication element to which content is transferred from among the plurality of communication elements.

By this means, the same content can be provided simultaneously to a plurality of users without a wait time, and an area from which content can be acquired can be changed dynamically, so that operations related to provision of content, such as the provision of content to more users, are easy.

In a data communication apparatus of the present invention, a correspondence information creation section decides communication elements to which content is transferred in such a way that a plurality of content is transferred to different numbers of communication elements.

By this means, the number of communication elements to which content is transferred can be made to differ according to the detail of that content.

A data communication apparatus of the present invention is equipped with a display section that is mounted in correspondence with a communication section and displays an area from which content can be acquired.

By this means, an area from which content can be acquired can be displayed by the display section.

A data communication apparatus of the present invention is equipped with a configuration whereby the display section changes display contents in synchronization with a decision by the correspondence information creation section.

By this means, the communication section can perform communication with a portable terminal in synchronization with display section display contents.

A data communication apparatus of the present invention is equipped with a configuration whereby the correspondence information creation section changes communication elements to which content is transferred in synchronization with a change of display section display contents.

By this means, the number of communication elements to which content is transferred can be changed based on display section display contents.

A data communication apparatus of the present invention is equipped with a configuration whereby the size of an area from which content displayed by the display section can be acquired is made proportional to the number of communication elements that transfer content decided by the correspondence information creation section.

By this means, the number of communication elements to which content is transferred can be made proportional to the size of an area from which content can be acquired on the display section.

A data communication apparatus of the present invention is equipped with a configuration that is further equipped with an identification section that identifies a switchable data carrier, wherein the correspondence information creation section decides a communication element to which content is transferred based on information held by a data carrier.

By this means, correspondence information can be created for a display section having an identification section, and content communication can be performed with a terminal device.

In a data communication apparatus of the present invention, the communication section is composed of optically-transparent material.

By this means, when the communication section is mounted on the surface of the display section a user can view the display section from the communication section side and select a desired content area, and communication between a user's terminal device and the communication section can be performed satisfactorily.

In a data communication apparatus of the present invention, the communication section is composed of flexible material.

By this means, desired content can be obtained in various places by utilizing a poster or the like, using the communication section together with a poster or the like affixed to a pillar, wall, or the like.

A data communication apparatus of the present invention is equipped with a configuration whereby the communication section transmits information identifying content before transmitting content.

By this means, a terminal device can confirm the contents of content before that content is transmitted from the communication section, and incorrect transmission can be prevented.

A data communication apparatus of the present invention is equipped with a configuration whereby the communication section has a receiving section that receives information transmitted from a terminal device via a communication element.

By this means, user information, content, or the like transmitted from a terminal device can be received.

A data communication apparatus of the present invention has a configuration that is further equipped with a transmission determination section that determines whether or not content transmission is performed based on information transmitted from a terminal device.

By this means, content can be transmitted based on a yes/no determination result from a terminal device, enabling incorrect transmission to be prevented.

A data communication apparatus of the present invention has a configuration whereby the correspondence information creation section decides communication elements to which content is transferred based on information transmitted from a terminal device.

By this means, correspondence information can be created reflecting information transmitted from a terminal device.

A data communication apparatus of the present invention has a configuration that is further equipped with a display section that is mounted in correspondence with the communication section and displays an area from which content can be acquired, wherein the display section decides display contents based on information transmitted from a terminal device.

By this means, display section display contents can be changed reflecting information transmitted from a terminal device.

A terminal device having: a communication section that has a plurality of communication elements for communicating content; a transfer section that transfers content to a predetermined communication element of the communication section; and a correspondence information creation section that decides a communication element to which content is transferred from among the plurality of communication elements, wherein the communication section includes a receiving section that receives the content and information identifying the content via a communication element to which the content is transferred from a data communication apparatus transmitting information identifying content before transmitting content, the terminal device comprising a reception determination section that determines whether or not reception of the content is performed based on information identifying the content received by the receiving section.

By this means, whether or not content reception is performed is determined in advance by performing communication of information identifying content with the communication section of the data communication apparatus, enabling reception of incorrect content to be prevented.

A terminal device of the present invention has a display section that decides contents that are displayed based on information identifying received content.

By this means, content that is received can be confirmed visually using the display section, enabling reception of incorrect content to be further prevented.

A data communication system of the present invention has a configuration equipped with a data communication apparatus having a communication section having a plurality of communication elements for communicating content, a transfer section that transfers content to a predetermined communication element of the communication section, and a correspondence information creation section that decides a communication element to which content is transferred from among the plurality of communication elements; and a terminal device that receives content via a communication element from the data communication apparatus.

By this means, error-free content reception can be performed after confirming the detail of content in advance between a terminal device and the data communication apparatus.

The disclosure of Japanese Patent Application No. 2007-292840, filed on Nov. 12, 2007, including the specification, drawings and abstract, is incorporated herein by reference in its entirety.

Industrial Applicability

The present invention is suitable for use as a data communication apparatus used for a kiosk terminal enabling desired content to be obtained from a user terminal or the like, or a home television enabling on-screen content to be obtained or the like.

The invention claimed is:

1. A data communication apparatus comprising:
   a content acquirer that stores a plurality of content items;
   a display that displays a plurality of content areas, each of the plurality of the content areas indicating an area corresponding to one of the plurality of the content items;
   a communicator that is mounted on the display and in which a plurality of communication elements communicating with a user terminal are arranged in a grid pattern;
   a content-related information acquirer that periodically acquires and updates statistical information related to each of the plurality of the content items from a network as content-related information;
   a correspondence information creator that creates correspondence information for each content item of the plurality of the content items, based on the content-related information, the correspondence information for each content item of the plurality of the content items indicating a correspondence between the content item, a subset of the plurality of the communication elements, and one of the plurality of the content areas;
   a communication element controller that establishes for each content item of the plurality of the content items, based on the correspondence information, transfer settings for transferring the content item to the corresponding subset of the communication elements; and
   a transferor that transfers each content item of the plurality of the content items to the corresponding subset of the plurality of the communication elements according to the transfer settings established for the content item, when the user terminal is positioned over the corresponding one of the plurality of the content areas and a connection request is received from the user terminal through the corresponding subset of the plurality of the communication elements.

2. The data communication apparatus according to claim 1, wherein the correspondence information creator updates the correspondence information when the statistical information is updated.

3. The data communication apparatus according to claim 2, wherein the correspondence information creator creates the correspondence information based on the popularity ranking such that a content area having higher popularity ranking is larger than another content area having lower popularity ranking.

4. The data communication apparatus according to claim 1, wherein the statistical information related to the content items is a popularity ranking of the content items.

5. The data communication apparatus according to claim 4, wherein the correspondence information creator creates the correspondence information based on the sales ranking such that a content area having higher sales ranking is larger than another content area having lower sales ranking.

6. The data communication apparatus according to claim 1, wherein the statistical information related to the content items is a sales ranking of the content items.

7. The data communication apparatus according to claim 1, further comprising a transmission determiner that determines whether or not the corresponding one of the plurality of the content items is transmitted to the user terminal, based on the connection request.

8. The data communication apparatus according to claim 1, wherein the plurality of the communication elements comprise a sheet antenna of optically-transparent flexible material and an associated drive circuit.

9. The data communication apparatus according to claim 1, wherein the communicator transmits content identification information to the user terminal before transmitting the content items.

10. The data communication apparatus according to claim 9, wherein the user terminal comprises a reception determiner that determines whether or not content reception is allowed, based on the content identification information received from the data communication apparatus.

11. A data communication apparatus comprising:
  a content acquirer that stores a plurality of content items;
  a display that displays a plurality of content areas, each of the plurality of the content areas indicating an area corresponding to one of the plurality of the content items;
  a communicator that is mounted on the display and in which a plurality of communication elements communicating with a user terminal are arranged in a grid pattern;
  a content-related information acquirer that stores content-related information which is related to each of the plurality of the content items;
  an information carrier that is mounted in the display and stores a type of the plurality of the content areas;
  an identifier that is mounted in the communicator at a position facing the information carrier and detects the type of the plurality of the content areas being displayed by the display, by detecting the information carrier;
  a correspondence information creator that creates correspondence information for each content item of the plurality of the content items, based on the type of the content area detected by the identifier and the content-related information, the correspondence information for each content item of the plurality of the content items indicating a correspondence between the content item, a subset of the plurality of the communication elements, and one of the plurality of the content areas;
  a communication element controller that establishes for each content item of the plurality of the content items, based on the correspondence information, transfer settings for transferring the content item to the corresponding subset of the communication elements;
  a transferor that transfers each content item of the plurality of the content items to the corresponding subset of the plurality of the communication elements according to the transfer settings established for the content item, when the user terminal is positioned over the corresponding one of the plurality of the content areas and a connection request is received from the user terminal through the corresponding subset of the plurality of the communication elements.

12. The data communication apparatus according to claim 11, further comprising a transmission determiner that determines whether or not the corresponding one of the plurality of the content items is transmitted to the user terminal, based on the connection request.

13. The data communication apparatus according to claim 11, wherein the plurality of the communication elements comprise a sheet antenna of optically-transparent flexible material and an associated drive circuit.

14. The data communication apparatus according to claim 11, wherein the communicator transmits content identification information to the user terminal before transmitting the content items.

15. The data communication apparatus according to claim 14, wherein the user terminal comprises a reception determiner that determines whether or not content reception is allowed, based on the content identification information received from the data communication apparatus.

* * * * *